3,164,557
POLYURETHANE PRODUCTION CATALYZED BY AN ORGANO-TIN COMPOUND, WHICH COMPOUND CONTAINS TERTIARY NITROGEN
Rudolf Merten, Cologne-Mulheim, and Gunther Loew, Cologne, Germany, assignors to Farbenfabriken Bayer Aktiengesellschaft, Leverkusen, Germany, a corporation of Germany
No Drawing. Filed Jan. 12, 1960, Ser. No. 1,870
Claims priority, application Germany Jan. 17, 1959
12 Claims. (Cl. 260—2.5)

This invention relates to polyurethane plastics and, more particularly, to a method for catalyzing the reaction between an organic isocyanate and an organic compound containing an active hydrogen containing group.

Polyurethane plastics are prepared by reacting organic compounds containing active hydrogen containing groups with organic polyisocyanates. If necessary, water or some other blowing agent is incorporated into the reaction mixture to produce a cellular polyurethane plastic. In the preparation of cellular polyurethane plastics, organic compounds containing primary hydroxyl groups such as hydroxyl polyesters, polyhydric polyalkylene ethers, polyhydric polyalkylene thioethers and polyacetals are conventionally used. The primary hydroxyl groups react rapidly with isocyanate groups and, therefore, insure rapid formation of a cellular structure when the poly-addition reaction proceeds concurrently with the evolution of carbon dioxide from the reaction between the isocyanate groups and water. The secondary hydroxyl groups are less reactive and, therefore, it is more difficult to prepare polyurethanes therefrom.

Organic compounds containing predominantly secondary hydroxyl groups also have a lower initial viscosity than the organic polyisocyanates due to the less polar structure of this type of organic compound. It is, therefore, difficult to achieve satisfactory mixing of organic compounds containing predominantly secondary hydroxyl groups so as to harmonize the simultaneous reaction of the organic polyisocyanate with water to produce carbon dioxide and with the organic compound containing predominantly secondary hydroxyl groups to produce polymers so that a cellular structure results. For this reason it has been preferred to carry out the reaction between the organic polyisocyanate and the organic compound containing predominantly secondary hydroxyl groups in a first step to produce an initial adduct having terminal —NCO groups and then react this initial adduct with water and, if necessary, additional organic polyisocyanate to produce the cellular polyurethane plastic. By carrying out the reactions in separate stages it is possible to overcome the difficulty involved in trying to harmonize the reactions.

It is also possible to carry out the reaction between an organic compound containing predominantly secondary hydroxyl groups and an organic polyisocyanate with the concurrent production of carbon dioxide in a single working step provided that a strongly basic catalyst such as endoethylene piperazine is included in the reaction mixture. The presence of the strongly basic catalyst results in a substantial increase in secondary reactions such as polymerization reactions which undesirably influence the properties of the cellular polyurethane plastic produced.

It has been heretofore proposed in U.S. Patent 2,846,408 to employ non-basic polyvalent metal salts of carboxylic acids or metal alcoholates as catalysts for the reaction between an organic polyisocyanate and an hydroxyl polyester. It is often necessary, in order to effectively catalyze the reaction with these compounds, to use critical amounts, if a stable cellular polyurethane plastic is to result.

It is, therefore, an object of this invention to provide an improved method of catalyzing the reaction between an organic isocyanate and an organic compound containing at least one active hydrogen containing group. Another object of this invention is to provide an improved method for the preparation of cellular polyurethane plastics. Another object of this invention is to provide an improved method of catalyzing the reaction between an organic polyisocyanate and an organic compound containing at least two active hydrogen containing groups. Still another object of this invention is to provide a method of catalyzing the reaction between an organic polyisocyanate and an organic compound containing at least two active hydrogen containing groups to produce a cellular polyurethane plastic. Still another object of this invention is to provide improved tin containing catalysts for the preparation of cellular polyurethane plastics from organic polyisocyanates and organic compounds containing at least two active hydrogen containing groups. Still another object of this invention is to provide improved cellular polyurethane plastics. A further object of the invention is to provide improved cellular polyurethane plastics obtained from an organic polyisocyanate and a polyhydric polyalkylene ether or thioether. Still another object of the invention is to provide improved cellular polyurethane plastics and an improved method for the preparation thereof from organic polyisocyanates and polyhydric polyalkylene ethers containing predominantly secondary hydroxyl groups.

The foregoing objects and others, which will become apparent from the following description, are accomplished in accordance with the invention, generally speaking, by providing a method of catalyzing the reaction between an organic isocyanate and an organic compound containing at least one active hydrogen containing group as determined by the Zerewitinoff method, said active hydrogen containing group being reactive with an —NCO group, wherein the said reactants are mixed in the presence of an organo-tin compound containing at least one tertiary nitrogen atom in at least one organic radical thereof. Thus, this invention contemplates a process for the preparation of polyurethane plastics by reaction of an organic polyisocyanate with an organic compound containing at least two active hydrogen containing groups, said reaction being catalyzed by an organo-tin compound containing at least one tertiary nitrogen atom in at least one organic radical thereof. In accordance with a preferred embodiment of the invention an organic polyisocyanate is mixed with an organic compound containing at least two active hydrogen containing groups and water in the presence of an organo-tin compound containing at least one tertiary nitrogen atom.

Any suitable organo-tin compound may be used to catalyze the reaction provided it contains at least one tertiary nitrogen atom in at least one organic radical thereof. Organo-tin compounds of this type are, for example, tetravalent tin salts of carboxylic acids, tetravalent tin alcoholates, tetravalent tin phenolates and tetravalent tin oximes. All of the organo-tin catalysts of the present invention preferably contain at least one carbon to tin bond and have at least one tertiary nitrogen atom in at least one organic radical thereof. These compounds preferably have the following generic formula:

wherein R is an organic radical, n is an integer of 1, 2 or 3, X is an organic radical obtained by removing a terminal hydrogen atom from an alcohol, a phenol, a carboxylic acid or an oxime, either X, R or both containing a tertiary nitrogen atom.

The organic radical, R, in the above formula may be any suitable organic radical. The term "organic radical" includes univalent aliphatic, cycloaliphatic, aromatic and heterocyclic radicals and substituted derivatives thereof. The organic radicals may be substituted with any substituent which does not interfere with the catalytic activity of the organo tin compound such as, for example, halogeno such as, for example, chloro, bromo, iodo, fluoro and the like; nitro; alkoxy such as, for example, methoxy, ethoxy, propoxy, butoxy, amoxy and the like; carboalkoxy such as, for example, carbomethoxy, carbethoxy and the like; dialkyl amino such as, for example, dimethyl amino, diethyl amino, dipropyl amino, methylethyl amino and the like; mercapto; carbonyl; thiocarbonyl; hydroxy; phosphato; phosphoryl and the like.

When aliphatic radicals are the organic radicals in the above formula they may be for example, alkyl, alkenyl, aralkyl and/or aralkenyl.

Any suitable alkyl radical may be the organic radical such as, for example, methyl, ethyl, n-propyl, isopropyl, n-butyl, isobutyl, sec-butyl, t-butyl, n-amyl and various isomers thereof such as, for example, 1-methyl-butyl, 2-methyl-butyl, 1,1-dimethylpropyl, 1,2-dimethylpropyl, 2,2-dimethylpropyl, 1-ethylpropyl and the like and the corresponding straight and branched chain isomers of hexyl, heptyl, octyl, nonyl, decyl, undecyl, dodecyl, tridecyl, tetradecyl, pentadecyl, hexadecyl, heptadecyl, octadecyl, nondecyl, eicosyl and the like.

Any suitable alkenyl radical may be the organic radical such as, for example, ethenyl, 1-propenyl, 2-propenyl, isopropenyl, 1-butenyl, 2-butenyl, 3-butenyl and the corresponding branched chain isomers thereof such as, for example, 1-isobutenyl, 2-isobutenyl, 1-sec-butenyl, 2-sec-butenyl, including 1-methylene-2-propenyl, 1-pentenyl, 2-pentenyl, 3-pentenyl, 4-pentenyl and the corresponding branched chain isomers thereof; 1-hexenyl, 2-hexenyl, 3-hexenyl, 4-hexenyl, 5-hexenyl and the corresponding branched chain isomers thereof such as, for example, 3,3-dimethyl-1-butenyl, 2,3-dimethyl-1-butenyl, 2,3-dimethyl-2-butenyl, 2,3-dimethyl-3-butenyl, 1-methyl-1-ethyl-2-propenyl and the various isomers of heptenyl, octenyl, nonenyl, decenyl, undecenyl, dodecenyl, tridecenyl, tetradecenyl, pentadecenyl, hexadecenyl, heptadecenyl, octadecenyl, nondecenyl, eicosenyl and the like.

Any suitable aralkyl radical may be the organic radical such as, for example, benzyl, α-phenyl-ethyl, β-phenyl-ethyl, α-phenyl-propyl, β-phenyl-propyl, gamma-phenyl-propyl, α-phenyl-isopropyl, β-phenyl-isopropyl, α-phenyl-butyl, β-phenyl-butyl, gamma-phenyl-butyl, delta-phenyl-butyl, α-phenyl-isobutyl, β-phenyl-isobutyl, gamma-phenyl-isobutyl, α-phenyl-sec-butyl, β-phenyl-sec-butyl, gamma-phenyl-sec-butyl, β-phenyl-t-butyl, α'-naphthyl-methyl, β'-naphthyl-methyl and the corresponding α'- and β'-naphthyl derivatives of n-amyl and the various positional isomers thereof such as, for example, 1-methyl-butyl, 2-methyl-butyl, 3-methyl-butyl, 1,1-dimethyl-propyl, 1,2-dimethyl-propyl, 2,2-dimethyl-propyl, 1-ethyl-propyl and said derivatives of the corresponding isomers of hexyl, heptyl, octyl and the like including eicosyl and the corresponding alkyl derivatives of phenanthrene, fluorene, acenaphthene, chrysene, pyrene, triphenylene, naphthacene and the like.

Any suitable aralkenyl radical may be the organic radical such as, for example, α-phenyl-ethenyl, β-phenyl-ethenyl, α-phenyl-1-propenyl, β-phenyl-1-propenyl, gamma-phenyl-1-propenyl, α-phenyl-2-propenyl, β-phenyl-2-propenyl, gamma-phenyl-2-propenyl, β-phenyl-isopropenyl and phenyl derivatives of the isomers of butenyl, pentenyl, hexenyl, heptenyl up to and including eicosenyl and other aromatic derivatives of alkenyl, that is alkenyl radicals derived from naphthalene, phenanthrene, fluorene, acenaphthene, chrysene, pyrene, triphenylene, naphthacene and the like.

Any suitable cycloalkyl radical may be the organic radical such as, for example, cyclopropyl, cyclobutyl, cycloamyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctadecyl, cyclononodecyl, cycloeicosyl, α-cyclopropyl-ethyl, β-cyclopropyl-ethyl, α-cyclobutyl-propyl, β-cyclobutyl-propyl, gamma-cyclobutyl-propyl, α-cycloamyl-isopropyl, β-cycloamyl-isopropyl and the like.

Any suitable cycloalkenyl radical may be the organic radical such as, for example, α-cyclohexyl-ethenyl, β-cyclohexyl-ethenyl, α-cycloheptyl-1-propenyl, β-cycloheptyl-1-propenyl, gamma-cycloheptyl-1-propenyl, α-cyclooctyl-2-propenyl, β-cyclooctyl-2-propenyl, gamma-cyclooctyl-2-propenyl, β-cyclononyl-isopropenyl, α-methylene-β-cyclododecyl-ethyl and the like.

Any suitable aryl radical may be the organic radical such as, for example, phenyl, α-naphthyl, β-naphthyl, α-anthryl, β-anthryl, gamma-anthryl including the various monovalent radicals of indene, isoindene, acenaphthene, fluorene, phenanthrene, naphthacene, chrysene, pyrene, triphenylene and the like.

Any suitable alkaryl radical may be the organic radical such as, for example, o-tolyl, m-tolyl, p-tolyl, 2,3-xylyl, 2,4-xylyl, 2,5-xylyl, 2,6-xylyl, 3,4-xylyl, 3,5-xylyl, o-cumenyl, m-cumenyl, p-cumenyl, mesityl, o-ethylphenyl, m-ethylphenyl, p-ethylphenyl, 2-methyl-α-naphthyl, 3-methyl-α-naphthyl, 4-methyl-α-naphthyl, 5-methyl-α-naphthyl, 6-methyl-α-naphthyl, 7-methyl-α-naphthyl, 8-methyl-α-naphthyl, 1-ethyl-β-naphthyl, 3-ethyl-β-naphthyl, 4-ethyl-β-naphthyl, 5-ethyl-β-naphthyl, 6-ethyl-β-naphthyl, 7-ethyl-β-naphthyl, 8-ethyl-β-naphthyl, 2,3-dipropyl-α-naphthyl, 5,8-diisopropyl-β-naphthyl and the like.

The organic radical, X, obtained by removing a terminal hydrogen atom from an alcohol, a phenol, a carboxylic acid or an oxime in the above formula, may be obtained from any suitable alcohol, phenol, carboxylic acid or oxime including those which contain tertiary nitrogen atoms. If an oxime constitutes the radical X, in other words, if the organic tin compound is an oxime derivative, it is not necessary for a tertiary nitrogen atom to be present beside the oxime nitrogen atom.

The term "alcohol" includes all organic compounds having an hydroxyl group bonded to an aliphatic radical, such as, for example, alkanols, aralkanols, cycloalkanols and the like. It is preferred, however, that the alcohols be derived from hydrocarbon aliphatic radicals or hydrocarbon aliphatic radicals containing tertiary amine atoms substituted with an hydroxyl radical. Statisfactory are those alcohols of the class described which also have other substituents such as, for example, halogen, such as Cl, Br, I, F or the like; nitro; alkoxy, such as, for example, methoxy, ethoxy, propoxy, butoxy, amoxy or the like; carboalkoxy, such as, for example, carbomethoxy, carbethoxy or the like; dialkyl amino, such as, for example, dimethyl amino, diethyl amino, dipropyl amino, methyl ethyl amino or the like; mercapto; carbonyl; thiocarbonyl; phosphato and phosphoryl; or the like. Therefore, the alcohols may be the alcohol corresponding to any of the aforementioned aliphatic radicals. In the interest of brevity these are not all again named here, but it is to be understood that this disclosure includes all of the alcohols resulting from the addition of an hydroxyl group at the free valence of said aliphatic radicals from methanol through α-methylene-β-cyclododecylethanol in the foregoing disclosure of aliphatic radicals as well as alcohols containing tertiary nitrogen atoms which are a preferred embodiment of the invention. Any suitable alcohol of the latter type, some of which have already been referred to above, may be used, such as, for example, N,N-dialkyl alkanol amines, such as, for example, N,N-dimethyl ethanol amine, N,N-dimethyl propanol amine and the like; N,N-diaryl alkanol amines such as, for example, N,N-diphenyl ethanol amine, N,N-diphenyl propanol amine and the like; alkyl dialkanol amines, such as, for example, N-methyl diethanol amine and the like; N-aryl dialkanol amines, such as, for example, N-phenyl diethanol amine and the like; N,N-dialkyl amino substituted polyhydric alcohols, such as, for example, 3-N,N-dimethyl amino-hexane-1,6-diol and the like; bis(dialkyl amino) alkanols, such as, for example, bis(N,N-dimethyl amino)-2-propanol and the like; trialkanol amines, such as, for example, triethanol amine, tripropanol amine, ethanol-dipropanol amine and the like; and reaction products of epoxides containing tertiary amino groups, such as, 3-N,N-diethyl amino epoxy propane and the like, with alcohols, such as, for example, ethanol, ethylene glycol or the like; reaction products of primary and secondary amines, such as, for example, methyl amine, ethyl amine, propyl amine, dimethyl amine, diethylamine, dipropyl amine, or the like with alkylene oxides, such as, for example, ethylene oxide, 1,2-propylene oxide, 1,2-butylene oxide, 1,2-amylene oxide and the like; the reduction products of peralkylated amino ketones such as methyl 2-N,N-dimethyl amino ethyl ketone and peralkylated amino acids, such as, for example, glycine-N,N-dimethyl and the like; and alcohols containing heterocyclic rings such as, for example, N,N-di-(β-hydroxyethyl)-piperazine, α-hydroxypyridine, 8-hydroxy quinoline and the like.

The term "phenol" includes all organic compounds having an hydroxyl group bonded to an aromatic radical, such as for example, the aromatic hydroxy compounds obtained by adding an hydroxyl group at the free valence of the above-named aromatic radicals. In the interest of brevity these are not all again named here but it is to be understood that this disclosure includes the corresponding aromatic hydroxy compounds from phenol through diphenylphenol in the foregoing disclosure of aromatic radicals. Of course, these aromatic radicals may be substituted by one or more other substituents, such as, for example, those for substitution on the alcohols, including all those from "halogen" through "phosphoryl" disclosed above. Since a preferred embodiment of the invention involves the use of phenols having tertiary nitrogen atoms, one may also employ other phenols containing tertiary nitrogen atoms such as, for example, dialkylaminophenols, such as, for example, p-N,N-dimethyl amino phenol, m-N,N-dimethyl amino phenol, p-N,N-diethyl amino phenol, p-N-methyl-N-ethyl amino phenol and the like; and peralkylated benzylamino phenols such as p-(dimethylamino methyl) phenol, 2,4,6-tris-(dimethylaminoethyl)-phenol and the like.

The term "carboxylic acid" includes all organic compounds having a carboxyl group. Any suitable carboxylic acid may be used to form the tin salt of the present invention, such as, for example, acetic acid, propionic acid, butyric acid, valeric acid, caproic acid, enanthic acid, caprylic acid, pelargonic acid, capric acid, hendecanoic acid, lauric acid, tridecanoic acid, myristic acid, pentadecanoic acid, palmitic acid, margaric acid, stearic acid, nonadecanoic acid, arachidic acid, heneicosanoic acid, behenic acid, tricosanoic acid, tetracosanoic acid, pentacosanoic acid, cerotic acid, heptacosanoic acid, octacosanoic acid, nonacosanoic acid, melissic acid, hentriacontanoic acid, lacceric acid, acrylic acid, methacrylic acid, oleic acid, capric acid, benzoic acid, naphthoic acid, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, phthalic acid, terephthalic acid, tricarballyic acid, trimellitic acid and the like. It is preferred, however, to employ peralkylated and preferably permethylated amino acids. Therefore, any suitable peralkylated monobasic monoamino acid may be used such as, for example, glycine-N,N-dimethyl, alanine-N,N-dimethyl, N,N-dimethyl amino butyric acid, valine-N,N-dimethyl, leucine-N,N-dimethyl, N,N-dimethyl-6-amino caproic acid, isoleucine-N,N-dimethyl, phenyl alanine-N,N-dimethyl, N,N-dimethyl p-amino benzoic acid, tryptophan-N,N-dimethyl, N,N-dimethyl-11-amino undecanic acid, N,N-dimethyl anthranilic acid, N-methyl-N-phenyl anthranilic acid, N-methyl benzyl amino acetic acid, and the like. Also, any suitable peralkylated monobasic diamino acid may be used such as, for example, ornithine-N,N,N',N'-tetramethyl, lysine-N,N,N',N'-tetramethyl, arginine-N,N,N',N',N''-pentamethyl, histidine-N,N,N'-trimethyl, N,N,N',N'-tetramethyl 2,4-amino benzoic acid and the like. Also, any suitable peralkylated monoamino dibasic acid may be used such as, for example, N,N-dimethyl aspartic acid, N,N-dimethyl glutamic acid, N,N-dimethyl 4-amino phthalic acid and the like. Any suitable peralkylated heterocyclic monoamino acid may be used such as, for example, proline N-methyl, quinonyl acetic acid, quinaldic acid, cinchoninic acid, N-methyl pyridine-2,3-dicarboxylic acid and the like. Any suitable peralkylated monobasic monoamino acid containing sulfur and/or oxygen may be used such as, for example, cystine-N,N,N', N'-dimethyl, methionine-N,N-dimethyl, and the like. Also any suitable peralkylated mono or polycarboxylic acid from the reaction of ammonia or in amine such as ethyl amine and acrylonitrile followed by saponification may be used. Also, the esters of polycarboxylic acids and peralkylated amino alcohols such as are obtained from phthalic acid and N,N-dimethyl amino ethanol or the like may be used.

The term "oxime" includes all organic compounds containing the monovalent radical —CH=N—OH. The oximes of all the organic radicals set forth above are, therefore, contemplated and are a part of this disclosure. Any suitable aldoxime or ketoxime may be used such as, for example, the reaction product of any suitable aldehyde or ketone with hydroxylamine. Any suitable aldehyde may be used, such as, for example, acetaldehyde, propionaldehyde, butyraldehyde, isobutyraldehyde, heptaldehyde, pinacolin, acrolein, crotenaldehyde, benzaldehyde, naphthaldehyde and the like. Any suitable ketone may be used such as, for example, acetone, methyl ethyl ketone, methyl vinyl ketone, cyclohexanone, acetophenone, benzophenone, benzalacetone and the like. Also, the oximes of dialdehydes and diketones may be used such as, for example, glyoxal, diacetyl, acetylacetone, acetonyl acetone, terephthalyl-aldehyde or aldehydes and ketones such as, aldol, 3-chloro-butanone, diacetonealcohol, N,N-dimethyl-5-aminopentanone, 2-chlorobenzaldehyde, nitrobenzaldehyde, salicyl aldehyde, anisaldehyde, vanillin, dimethylaminobenzaldehydes and the like. Any of the aforementioned aldehydes or ketones may also contain other substituents such as, for example, those described above in connection with the alcohols.

The invention, therefore, contemplates generally the method of catalyzing the reaction between an organic isocyanate and an organic compound containing at least one active hydrogen containing group, including the use of organic polyisocyanates and organic compounds containing at least two active hydrogen containing groups to prepare polyurethane plastics generally or the combination of these materials with a blowing agent such as water or a halohydrocarbon, such as, for example, dichlorodifluoromethane, trifluorochloromethane and the like, to produce cellular polyurethane plastics. The tin catalyst preferably contains tetravalent tin, at least one tertiary nitrogen atom and at least one carbon to tin bond. Therefore, the preferred tin catalysts may be characterized as tetravalent tin salts of carboxylic acids, tetravalent tin alcoholates, tetravalent tin phenolates and tetravalent tin oximes.

The tin compounds having the formula set forth above may be prepared by the process described in U.S. Patent 2,727,917 or by any other suitable process such as, for example, reaction of a salt of a carboxylic acid with a dialkyl or diaryl aldehyde or by reacting the free acid with a dialkyl or diaryl oxide. These methods can also be used in the production of the tin compounds of the present invention which contain from 1 to 3 of the organic radicals set forth above. Depending on the nature of the reactant and the proportions in which they are employed it is possible to produce linear or branched tin compounds of low molecular weight or of relatively high molecular weight. Instead of using tin compounds with only one tetravalent tin atom in the molecule, it is also possible to use stannoxanes having the grouping —Sn—O—Sn— in the molecule, and in which each tin atom is attached to an organic radical by means of at least one carbon to tin bond.

The tin compounds, depending on their nature, are solid, amorphous, pasty or even liquid and viscous products, and may be added in several different ways to the reaction components. Thus, the liquid tin compounds are generally of good compatibility with the polyhydric polyalkylene ethers and hydroxyl polyesters and can be immediately added thereto. Solid tin compounds can be dissolved in solvents, such as acetone, aromatic hydrocarbons, chlorinated hydrocarbons and ethers or in one of the reaction components. They can, however, also be added in solid form to the reaction mixture to be foamed or in the form of a paste with the polyhydroxy compound. The tin compounds that are soluble in the reaction mixture are preferred. The quantities of catalyst which are necessary vary considerably and naturally depend on the nature and composition of the reaction mixture. On the other hand, the active tin-content of the catalysts varies according to the tin compounds which are used. Generally speaking, the catalysts are employed in an amount of from about 0.001 to about 5.0 percent by weight, based on the weight of the reaction mixture.

The tin compounds employed as catalysts in accordance with the present invention exhibit excellent stability to the effects of hydrolysis and to both thermal and chemical degradation. The tin catalysts may be used in smaller quantities than the heretofore known basic catalysts such as triethylene diamine. Moreover, the tin compounds of the present invention are relatively neutral or acidic in nature as compared to the heretofore known accelerators and, therefore, catalyze the reaction between either hydroxyl polyesters or polyhydric polyalkylene ethers containing secondary hydroyl groups in a single working step.

The tin catalysts of the present invention are particularly useful in the production of cellular polyurethane plastics. They represent an improvement over the heretofore known catalysts because lesser amounts are required to achieve the same effect and, moreover, they do not exert adverse effects on the final product.

Any suitable organic compound containing at least one active hydrogen containing group as determined by the Zerewitinoff method, said group being reactive with an —NCO group, may be used for reaction with organic isocyanates. Suitable compounds include, therefore, alcohols, phenols, polyhydric alcohols, polyhydric polyalkylene ethers, polyhydric polyalkylene thioethers, hydroxyl polyesters, hydroxyl polyester amides, polyacetals and the like.

Generally speaking, all the heretofore known organic compounds containing an active hydrogen containing group which will react with an —NCO group are contemplated. The presence of these groups may be determined by the well-known Zerewitinoff method, J. Am. Chem. Soc. 49, 3181 (1927). Therefore, the active hydrogen containing groups may be, for example, hydroxyl groups, primary amino groups, secondary amino groups, carboxy groups (—COOH), mercapto groups, enolizable methylene groups and the like.

Therefore, any of the alcohols, phenols, amines and the like set forth above may be reacted with an organic isocyanate in the presence of the tin compounds of the present invention. The invention, therefore, contemplates the alcohols, phenols and the like obtained by adding one or more of the above-defined groups to any of the organic radicals set forth above. The invention, therefore, contemplates the catalysis of the reaction between any organic compound having an active hydrogen containing group and an organic isocyanate including the reaction of methanol, ethanol, ethyl amine, phenol, aniline, acetic acid, and the like with any of the isocyanates disclosed below.

In a preferred embodiment of the invention organic compounds containing at least two active hydrogen containing groups as defined above are reacted with organic polyisocyanates in the presence of the organo-tin compounds to prepare polyurethane plastics. This procedure is best adapted to the production of cellular polyurethane plastics.

The organic compounds containing at least two active hydrogen containing groups may, therefore, be prepared from alkylene oxides such as, for example, propylene oxide, butylene oxide, 1,2-amylene oxide and the like as well as aralkylene oxides such as, for example, styrene oxide. The epihalohydrins may also be used, such as, for example, epichlorohydrin and the like. Also, organic compounds containing at least two active hydrogen containing groups may be prepared by condensing one of the aforementioned types of oxides with any suitable polyhydric alcohol such as, for example, alkane diols such as, for example, ethylene glycol, 1,3-propane diol, 1,4-butane diol, 1,3-butane diol, 1,2-isopropane diol, 1,3-isobutane diol, 1,5-pentane diol, 1-methyl pentane-1,4-diol, 1,6-hexane diol, 1,7-heptane diol, 1,8-octane diol, 1,16-pentadecane diol and the like, alkane triols such as, for example, 1,3,6-hexanetriol, glycerine and the like, alkane polyols such as sorbitol, alkene diols such as, for example, 1,2-ethene diol, 1-butene-1,4-diol, propene-1,3-diol and the like, alkine diols such as, for example, 1,3-butadine-1,4-diol, polyhydric ethers such as, for example, trimethylol propane, pentaerythritol, polyethylene ether glycols, polypropylene ether glycols and the like and phenols such as, for example, hydroquinone, 4,4'-dihydroxy diphenyl methane, 4,4'-dihydroxy diphenyl dimethyl methane, 1,5-dihydroxy naphthalene and the like. Also one may condense the aforementioned oxides with aliphatic or aromatic polyamines such as, for example, alkylene diamines such as, for example, ethylene diamine and the like, alkylene triamines such as, for example, triethylene diamine and the like, aromatic amines such as, for example, aniline, p-amino aniline and the like and heterocyclic amines such as, for example, piperazine and the like. Condensation products of the aforementioned oxides with amino alcohols such as, for example, alkanol amines such as, for example, ethanol amine and the like, N-alkyl alkanol amines such as, for example, N-methyl ethanol amine and the like, dialkanol amines such as, for example, diethanol amine and the like, N-alkyl dialkanol amines such as, for example, N-methyl diethanol amine, trialkanol amines such as, for example, triethanol amine and the like, N,N,N',N'-tetrakis(2-hydroxy propyl)ethylene diamine and the like and phenol amines such as, for example, p-amino phenol and the like may also be used. One may also employ condensation products of the aforementioned oxides with hydroxyl polyesters such as are obtained for example from polycarboxylic acids and polyhydric alcohols or the reaction product of castor oil, sugar or the like. Any suitable polycarboxylic acid may be used such as, for example, malonic acid, succinic acid, glutaric acid, adipic acid, phthalic acid, terephthalic acid, sebacic acid, suberic acid, maleic acid, itaconic acid and the like. Any suitable polyhydric alcohol may be used such as, for example, 1,4-butane diol, trimethylol propane, pentaerythritol or the like. Polyesters prepared from these components may be used without modification with the oxides. It is preferred that they have terminal hydroxyl groups.

Ethylene oxide may be partially incorporated into the oxides recited above by carrying out the condensation of the oxides recited above in the presence of ethylene oxide or by subsequently condensing the polymers recited above with ethylene oxide. The resulting polyhydroxy compounds containing a minor proportion of ethylene oxide do not differ substantially from the aforementioned polyhydroxy compounds as regards their reactivity with respect to polyisocyanates. Polyhydroxy compounds containing secondary hydroxyl groups can also be produced by esterifying one or more of the previously mentioned polyalcohols, some of which may already contain secondary hydroxyl groups, with a deficient quantity of a polycarboxylic acid, such as succinic acid, adipic acid, sebacic acid, dimerised and trimerised fatty acids, phthalic acid, maleic acid and fumaric acid, it being possible simultaneously to incorporate tertiary nitrogen atoms or carbonamide groups into the polyesters by the concurrent use of amino alcohols. In addition to the preferred polyhydroxy compounds containing secondary hydroxyl groups, it is also possible to use compounds which contain primary hydroxyl groups. Such compounds can, for example, be obtained by the esterification of the aforementioned primary polyalcohols or amino alcohols with the aforementioned polycarboxylic acids. This group of compounds also includes a wide variety of polyethers, such as those derived from ethylene glycol, tetrahydrofuran and also thiodiglycol as well as various polyacetals, such as are obtained for example from polyhydric alcohols, such as, for example, ethylene glycol and the like disclosed above, and aldehydes, such as formaldehyde.

The linear and branched organic compounds containing active hydrogen containing groups employed in the process according to the present invention should have an acid number below about 15 and preferably from 0 to about 2 when they are derived from polyesters. All types of the organic compounds containing at least two active hydrogen containing groups should preferably have a molecular weight of at least about 500 and an —OH equivalent of from about 100 to about 3000 if the only active hydrogen groups are hydroxyl groups. By "—OH equivalent" is meant the amount of the compound in grams which contains 1 mol of hydroxyl groups. The aforementioned compounds may be mixed in any desired manner with the organic isocyanate. They may also be employed in admixture with the aforementioned low molecular weight compounds provided the —OH equivalent of the mixture is between about 100 and about 3000.

Any suitable organic isocyanate may be used including aliphatic, cycloaliphatic, alkaryl, aralkyl, heterocyclic and aryl mono- and polyisocyanates, such as, for example, ethyl isocyanate, propyl isocyanate, butyl isocyanate, pentyl isocyanate, hexyl isocyanate, heptyl isocyanate, octyl isocyanate and the like including eicosyl isocyanate. As diisocyanates, there may be used tetramethylene diisocyanate, pentamethylene diisocyanate, octamethylene diisocyanate, dodecamethylene diisocyanate, 3,3'-diisocyanato dipropyl ether, cyclohexyl isocyanate, tetrahydro-α-naphthyl isocyanate, tetrahydro-β-naphthyl isocyanate, xylylene diisocyanates, p,p'-diphenylmethane diisocyanate, β,β'-diphenylpropane 4,4'-diisocyanate and the like. Other examples are benzyl isocyanate, undecamethylene diisocyanate, p-isocyanato benzyl isocyanate, phenyl isocyanate, p-dodecyl phenyl isocyanate, 5-dodecyl-2-methyl phenyl isocyanate, 3-nitro-4-dodecyl phenyl isocyanate, p-cetyloxy phenyl isocyanate, m-phenylene diisocyanate, p-phenylene diisocyanate, 1-methyl phenylene 2,4-diisocyanate, naphthylene 1,4-diisocyanate, naphthylene 1,5-diisocyanate, 2,6-toluylene diisocyanate, 1,3,5-benzene triisocyanate, p,p',p''-triphenylmethane triisocyanate, tetrahydrofurfuryl isocyanate and the like. Also, the addition products of polyisocyanates with a deficient quantity of a low molecular weight alcohol, such as 1,4-butane diol, glycerine, trimethylol propane, the hexanediols and hexanetriols and addition products of the afore-mentioned polyisocyanates with low molecular weight polyesters, such as castor oil, may also be used, as well as the reaction products of the afore-mentioned polyisocyanates with acetals as described in copending application Serial No. 821,360. Also suitable are the isocyanate polymers described in German patent specifications Nos. 1,022,789 and 1,027,394, as laid open to inspection. Mixtures of organic isocyanates may also be employed. The process according to the present invention can also be used for the foaming of the "initial adducts" obtained from the afore-mentioned organic compounds containing at least two active hydrogen containing groups and an excess of polyisocyanate by adding water.

The cellular polyurethane plastics are produced in accordance with the invention by the simultaneous intensive mixing of the components including the organic compound containing at least two acitve hydrogen containing groups, the organic polyisocyanate and the tin compound together with water and/or other additives. The mixing of these components is preferably effected mechanically for example in the manner described in U.S. Reissue Patent 24,514 to Hoppe et al. issued August 12, 1958. It is also possible to prepare a prepolymer by reaction of the organic polyisocyanate and the organic compound containing at least two active hydrogen containing groups in a first step and then reacting the resulting isocyanate terminated prepolymer with water in a second step in the presence of the tin compounds of the present invention to prepare a cellular polyurethane plastic.

A wide range of different additives can be added to the reaction mixture in the production of cellular polyurethane plastics. Thus, it is sometimes convenient to use emulsifiers such as, for example, sulfonated castor oil and/or adducts of ethylene oxide with hydrophobic compounds containing one or more active hydrogen atoms, foam stabilizers such as, for example siloxane oxyalkylene block copolymers having the formula

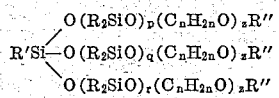

wherein R, R' and R'' are alkyl radicals having 1 to 4 carbons atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equal to from about 26 to about 34 or similar stabilizer. A process which combines the catalyst and this stabilizer is contemplated by the invention as a preferred embodiment. Silicone compounds represented by the above formula and a method for making them are disclosed in U.S. Patent 2,834,748 to Bailey et al.

Accelerator compounds containing basic nitrogen in the molecule may also be used as additive compounds which will aid in the production of regular pore size in the final product such as, for example, paraffin oils and a variety of silicon oils such as, for example, dimethyl polysiloxanes and the like, in addition to dyestuffs, fillers, flame-proofing agents and plasticisers.

The tin catalyst of the present invention may also be employed with the heretofore known basic accelerators such as, for example, tertiary amines such as, for example, dimethyl benzylamine, 1-ethoxy-3-dimethylamino-propane, endoethylene piperazine in small quantities, permethylated-N-ethylaminopiperazine and dimethyl ethyl amine as well as metal compounds such as, for example, alkali metal hydroxides such as, for example, sodium hydroxide, alkali metal carbonates such as, for example, sodium carbonates, alkali metal phenolates such as, for example sodium phenoxide and alkali metal alcoholates such as, for example, sodium methoxide.

The cellular polyurethane plastics produced in accordance with the present invention have excellent mechanical and physical properties and their bulk density can be modified in known manner by varying the quantity of polyisocyanate and water employed in their production. Cellular polyurethane plastics may be used in a variety of commercial applications including both thermal and sound insulation, cushions, upholstery units, crash pads and arm rests for automobiles and the like. Non-porous polyurethane plastics have good abrasion and tear resistance and can be used in the production of gears, gaskets, driving members, accumulation bladders, automobile tires and a whole host of other applications.

Specific examples of heterocyclic radicals which may be the organic radical, R, in the generic formula for the tin compounds are for example, α-furfuryl, β-furfuryl, thienyl and the like.

The invention is further illustrated by the following examples in which the parts are by weight unless otherwise indicated.

*Example 1*

About 100.0 parts of a polyester of adipic acid, diethylene glycol and hexanetriol (OH number 56); about 43.0 parts of toluylene diisocyanate; about 0.8 part of dimethylbenzylamine; 0.1 part of dibutyl-tin-di(pyridine-4-carboxylic acid ester); about 1.5 parts of a sulphonated castor oil (50% water content); about 1.0 part of a sulphonated ricinoleic acid (50% water content); and about 2.0 parts of water are mixed mechanically and the resulting mixture placed in a mold. The mixture immediately starts to foam and quickly solidifies into an elastic foam material which is free from cracks and which does not shrink after curing or hardening.

*Example 2*

About 80.0 parts of a polyester of adipic acid, phthalic acid and hexanetriol (OH number 300); about 20.0 parts of a polyester of adipic acid, hexanetriol and butylene glycol (OH number 220); about 9710 parts of toluylene diisocyanate; about 0.1 part of dibutyl-tin-bis-(4-dimethylaminobenzoic acid ester); and about 4.0 parts of a sulphonated castor oil (50% water content) are mechanically mixed in a machine and the resulting reaction mixture thereby obtained is placed in a mold. The mixture immediately starts to foam and quickly solidifies into an elastic foam material which is free from cracks and which does not shrink after curing or hardening.

*Example 3*

About 100.0 parts of a branched polypropylene glycol (OH number 45); about 40.0 parts of toluylene diisocyanate; about 1.5 parts of a water-soluble silicone-ethylene oxide copolymer; about 0.5 part of dibutyl-tin-bis-(ω-dimethylamino-caproic acid ester); and about 3.3 parts of water are mechanically mixed and the resulting reaction mixture is placed in a mold. The mixture immediately starts to foam and quickly solidifies into an elastic foam material which is free from cracks and which does not shrink after curing or hardening.

*Example 4*

About 100.0 parts of the reaction product of sorbitol and propylene oxide (OH number 65); about 42.0 parts of toluylene diisocyanate; about 1.5 parts of a water-soluble silicone-ethylene oxide copolymer; about 0.6 part of dibutyl-tin-bis-(dimethylaminoethylate); and about 3.2 parts of water are mechanically mixed and the resulting reaction mixture placed in a mold. The mixture immediately starts to foam and quickly solidifies into an elastic foam material which is free from cracks and does not shrink after hardening or curing.

*Example 5*

About 50.0 parts of a linear polypropylene glycol (OH number 56); about 50.0 parts of a branched polypropylene glycol (OH number 56); about 38.0 parts of toluylene diisocyanate; about 1.5 parts of a water soluble silicone-ethylene oxide copolymer; about 0.5 part of dibutyl-tin-bis-(diethylamino-2-pentylate); and about 2.9 parts of water are mixed in a machine mixer such as is disclosed in U.S. Reissue Patent 24,514 and the resulting reaction mixture placed in a mold. The mixture immediately starts to foam and quickly solidifies into an elastic foam material which is free from cracks and which does not shrink after curing or hardening.

*Example 6*

(a) About 118 parts of dibutyl-dimethoxy-tin and 70 parts of isobutyraldoxime are transesterified with exclusion of moisture at 130° C., and finally in a vacuum of 15 mm. Hg, whereby 140 parts by weight of a yellowish oil having a refractive index $n_D^{20}$: 1.4991 are obtained.

(b) About 100 parts of a branched polypropylene glycol having an OH number of 45 and which has been obtained by the addition of propylene oxide to hexanetriol, about 40 parts of a toluylene-diisocyanate containing the 2,4 and 2,6-isomers in a ratio of 80:20, about 3.3 parts of water, about 1.2 parts of the tin aldoxime prepared as described in Example 6a and about 1.5 parts of a water-soluble siloxane-alkylene oxide copolymer are mixed together in the foaming apparatus described in French patent specification No. 1,074,713. A quickly setting foam having good mechanical properties is obtained after 2 minutes.

*Example 7*

In the preparation of the tin aldoxime salt according to the procedure of Example 6a, the dibutyl-dimethoxytin is replaced by a corresponding quantity of a polymer having the formula $CH_3-O-(Sn(C_4H_9)_2O)_nCH_3$ in which $n=1.5$. Results analogous to those obtained in Example 6 are obtained in the present case both in the preparation of the tin salt and in the use thereof in the foaming reaction.

*Example 8*

(a) A viscous, yellowish tin salt having a refractive index $n_D^{20}=1.4828$ is obtained from about 258 parts of heptyl aldoxime and about 295 parts of dibutyl-dimethoxytin by following the procedure of Example 6a.

(b) About 80 parts of a polyester derived from about 51 mols of adipic acid, about 1 mol of phthalic acid anhydride and about 8.4 mols of hexanetriol having an OH number of about 300, about 20 parts of a polyester derived from about 1.43 mols of adipic acid, about 1.0 mol of hexanetriol and about 1.0 mol of butylene-1,3-glycol having an OH number of 220, about 97 parts of toluylene diisocyanate containing the 2,4 and 2,6-isomers in a ratio of 65:35, about 0.5 part of the tin salt prepared as described in Example 8a and about 4.0 parts of a 50% aqueous solution of sodium-castor oil sulphonate, are mixed together to produce a quickly rising and setting hard foam having good mechanical properties.

*Example 9*

About 100 parts of a copolymer which has been obtained by adding propylene oxide to a mixture of hexanetriol and propylene-1,2-glycol in a molar ratio of about 1:1 and having an OH number of 56, about 35.5 parts by volume of the toluylene diisocyanate employed in Example 6b, about 3 parts of water, about 1.5 parts of the silicone oil in Example 6b and about 1.0 part by weight of the tin compound prepared as described in Example 8a are mechanically mixed together in the foaming apparatus described in French patent specification No. 1,074,713. A foam is thereby obtained which rises in 90 seconds and sets in about 20 minutes even at the surface and which has a good tensile strength and breaking elongation:

Physical properties:
    Bulk density_____ 31 kg./m.³.
    Tensile strength_____ 1.0 kg./m.³.
    Breaking elongation_____ 410%.
    Elasticity_____ 20%.
    Permanent deformation_____ 14 (22 hours at 70° C. ½ hour recovery).

*Example 10*

(a) About 245 parts of a yellowish oil having a refractive index $n_D^{20}$: 1.4890 are obtained by the transesterification of about 145 parts of N,N-diethylaminopentanone-2-oxime (B.P. 0.08 mm. Hg=100–105° C.) with about 125 parts of dibutyl-dimethoxy-tin as described in Example 6a.

(b) About 100 parts of the polypropylene glycol employed in Example 9, about 40 parts of the toluylene diisocyanate employed in Example 6, about 1.5 parts of the silicone oil employed in Example 6b, about 0.9 part of the tin compound prepared as described in Example 10a and about 3.1 parts of water are mixed together, and after being poured out, yield a foam material which rises in 90 seconds, sets in 20 minutes and has good mechanical properties.

*Example 11*

About 100 parts of a linear polypropylene glycol having an OH number of 56, about 42 parts of the toluylene diisocyanate employed in Example 6b, about 1.5 parts of the silicone oil employed in Example 6b, about 0.3 part of N,N″,N″-trimethyl-N′-(beta - aminoethyl)-piperazine, about 3.3 parts of water and 1.0 part of a transesterification product obtained by reacting about 65.6 parts of p-dimethyl-aminobenzaldehydeoxime with about 59 parts of dibutyl-dimethoxy-tin at a maximum temperature of 150° C. and at a pressure of 16 mm. Hg, on being mixed, yield a satisfactory foam material having good mechanical properties.

*Example 12*

1.5 parts of a basic silicone oil having the formula $$H_2N-CH_2-CH_2-O-(Si(CH_3)O)_n-CH_2CH_2NH_2$$

and which has been obtained by the transesterification of 1 mol of the corresponding diethoxy-compound having a molecular weight of 799 with about 2 mols of ethanolamine are employed in the process described in Example 11 instead of the silicone oil used in Example 6b. A foam having similar properies to that produced in Example 11 is obtained.

*Example 13*

100 parts by weight of a branched polypropylene glycol prepared by addition of propylene oxide to hexane triol and having an OH number of 55, 38 parts by weight of toluylene diisocyanate, 1.5 parts by weight of a water-soluble polysiloxane alkylene oxide copolymer, 2.9 parts by weight of water and 1 part by weight of dibutyl tin-bis-(ω-dimethyl amino caproate) obtained by azeotropic esterification of 159 parts by weight of the free acid and 125 parts by weight of dibutyl tin oxide with toluene as entrainer in viscous form, having a refraction index $n_D^{20}$ 1.4900, are mixed mechanically and the foamable material thereby produced is placed in a mold. The highly elastic foam rises quickly within 1.5 minutes and hardens in short time.

| | |
|---|---|
| Bulk density _____kg./cm.³__ | 36 |
| Tearing strength _____kg./cm.²__ | 1 |
| Elongation at break _____percent__ | 330 |
| Elasticity _____do____ | 50 |
| Permanent elongation _____do____ | 12 |

*Example 14*

100 parts by weight of a linear polypropylene glycol (OH number 56), 39 parts by weight of toluylene diisocyanate according to Example 13, 0.2 part by weight of endoethylene piperazine, 3 parts by weight of water, 1.3 parts by weight of the transesterification product of 1 mol of $C_2H_5O-(Si(CH_3)_2O)_9-C_2H_5$ with 2 mols of ethanol amine, and 0.6 part by weight of dibutyl tin-bis-(α-dimethyl amino acetate) prepared by azeotropic esterification according to Example 13 in viscous form and having a refraction index $n_D^{20}$ 1.5086, yield after mixing a rapidly rising foam with good elastic properties.

*Example 15*

100 parts by weight of the polypropylene glycol of Example 13, 38 parts by weight of toluylene diisocyanate of Example 13, 1.5 parts by weight of a polysiloxane of Example 13, 2.6 parts by weight of water and 1 part by weight of dioctyl tin-bis-(ω-dimethyl amino caproate) prepared by transesterification of the free acid of dioctyl dimethoxy tin and having a refraction index $n_D^{20}$ 1.4738 result after being mechanically mixed in a quickly rising and hardening foam with the following mechanical properties:

| | |
|---|---|
| Bulk density _____kg./m.³__ | 32 |
| Tearing strength _____kg./cm.²__ | 1.2 |
| Elongation at break _____percent__ | 255 |
| Elasticity _____do____ | 40 |
| Permanent elongation _____do____ | 25 |

*Example 16*

100 parts by weight of the polypropylene glycol of Example 13, 38 parts by weight of toluylene diisocyanate of Example 13, 1.5 parts by weight of the polysiloxane of Example 13, 2.8 parts by weight of water, 1 part by weight of 1-ethoxy-3-dimethyl amino propane and 1 part by weight of dibenzyl tin-bis-(ω-dimethyl amino caproate) prepared by transesterification of the free acid with dibenzyl dimethoxy tin up to 130° C. and having a refraction index $n_D^{20}$ 1.5520 yield after mixing a foam with a bulk density of 42 kg./m.³ and an elasticity of 46%.

*Example 17*

100 parts by weight of the branched polypropylene glycol of Example 13, 38 parts by weight of toluylene diisocyanate, 1 part by weight of the polysiloxane of Example 13, 2.6 parts by weight of water and 0.3 part by weight of a tin compound of the formula

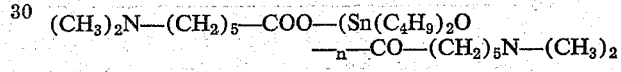

with $n=1.5$ and prepared by transesterification of the corresponding dimethoxy stannoxanes with 2 mols of dimethyl amino caproic acid and having a refraction index $n_D^{20}$ 1.4865 result after foaming in a foam with a

| | |
|---|---|
| Bulk density of _____kg./m.³__ | 34 |
| Elasticity of _____percent__ | 44 |
| Tearing strength of _____kg./cm.²__ | 1.1 |
| Elongation at break of _____percent__ | 220 |

*Example 18*

100 parts by weight of the polypropylene glycol of Example 13, 38 parts by weight of toluylene diisocyanate of Example 13, 1 part by weight of the polysiloxane of Example 13, 2.6 parts by weight of water and 0.5 part by weight of the stannoxane compound of the formula

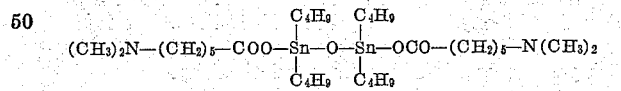

obtained by azeotropic esterification of 1 mol of dibutyl tin oxide with 1 mol of ω-dimethyl amino caproic acid with toluene as entrainer and having a refraction index $n_D^{20}$ 1.4867 result after mixing in a rapidly hardening foam.

| | |
|---|---|
| Bulk density _____kg./m.³__ | 35 |
| Tearing strength _____kg./cm.²__ | 1.3 |
| Elongation at break _____percent__ | 275 |
| Elasticity _____do____ | 45 |

*Example 19*

100 parts by weight of polypropylene glycol of Example 13, 38 parts by weight of toluylene diisocyanate of Example 13, 1 part by weight of the polysiloxane of Example 13, 2.6 parts by weight of water, 0.5 part by weight of 1-ethoxy-3-dimethyl amino propane and 1.6 parts by weight of a 50% solution in acetone of a basic tin compound of the formula

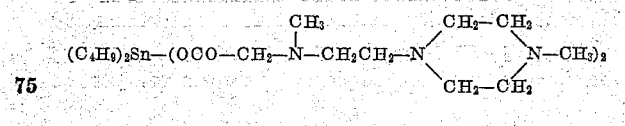

prepared by azeotropic esterification of 2 mols of the corresponding acid with 1 mol of dibutyl tin oxide are mixed in a machine. A rapidly rising and hardening foam is obtained with a Bulk density of _____kg./m.$^3$__ 35
Tearing strength of _____kg./cm.$^2$__ 1.3
Elongation at break of _____percent__ 255
Elasticity of _____do____ 45
Permanent elongation of _____do____ 14

Example 20

*Manufacture of the catalyst.*—70 parts by weight of triethyl methoxy tin are transesterified with 47.7 parts by weight of ω-dimethyl amino caproic acid up to 130° C. The triethyl tin-ω-dimethyl amino caproate is obtained in a quantitative yield. Melting point=65° C.

100 parts by weight of the polypropylene glycol of Example 13, 38 parts by weight of toluylene diisocyanate of Example 13, 1.5 parts by weight of the polysiloxane of Example 13, 2.6 parts by weight of water, 0.5 part by weight of N-ethyl morpholine and 0.5 part by weight of the above catalyst dissolved in one ml. of acetone are mixed mechanically. The mixture immediately starts to foam and solidifies within 10 minutes into a foam material with the following physical properties:

Bulk density _____kg./m.$^3$__ 35
Tearing strength _____kg./cm.$^2$__ 0.8
Elongation at break _____percent__ 215
Elasticity _____do____ 27

Example 21

100 parts by weight of a polyether isocyanate (9% NCO) obtained by reacting together 100 parts by weight of the polypropylene glycol of Example 14 with 37.3 parts by weight of toluylene diisocyanate, 1 part by weight of polydimethyl siloxane, 1.9 parts by weight of water and 1 part by weight of dibutyl tin-bis-(ω-dimethyl amino caproate) are mechanically mixed. The mixture results in a quickly hardening foam with good mechanical properties.

Example 22

100 parts by weight of a polyester prepared from adipic acid diethylene glycol and trimethylol propane (OH number 58, acid number 1.3, viscosity 18,500 cp./25°), 38 parts by weight of toluylene diisocyanate, 25 parts by weight of water and a solution of 2 ml. toluene of 1 part by weight of a tin compound prepared by transesterification of 1 mol of dibutyl dimethoxy tin with 2 mols of 8-oxyquinoline (M.P. 150–154° C.) are rapidly mixed. The mixture quickly expands to give a yellowish-green colored foam with good elasticity.

Example 23

100 parts by weight of a branched polypropylene glycol, prepared by addition of propylene oxide to a mixture of propane diol-1,2 and trimethylol propane (1:1; OH number 56), 40 parts by weight of toluylene diisocyanate, 2.9 parts by weight of water, 1.5 parts by weight of a water-soluble polysiloxane alkylene oxide copolymer and 0.5 part by weight of a basic tin phenolate prepared from 1 mol of dibutyl dimethoxy tin and 2 mols of 2,4,6-tris-(dimethyl amino methyl)-phenol up to 130° C. in vacuo, and having a refraction index $n_D^{20}$ of 1.5370 are mixed together in an apparatus described in French patent specification No. 1,074,713. The foam rises within one minute and is cured after 10 minutes.

Bulk density _____kg./m.$^3$__ 33
Tearing strength _____kg./cm.$^2$__ 1.0
Elongation at break _____percent__ 360
Elasticity _____do____ 50
Permanent elongation _____do____ 90

If instead of 0.5 part by weight 0.25 part by weight of the tin compound are employed, the foam exhibits the following mechanical properties:

Bulk density _____kg./m.$^3$__ 35
Tearing strength _____kg./cm.$^2$__ 0.8
Elongation at break _____percent__ 320
Elasticity _____do____ 49
Permanent elongation _____do____ 12

Example 24

100 parts by weight of the polypropylene glycol of Example 23, 1.5 parts by weight of the polysiloxane of Example 23, 2.9 parts by weight of water and 1 part by weight of a basic tin phenolate prepared by transesterification of 1 mol of dibutyl dimethoxy tin with 2 mols of dimethyl amino methyl phenol up to 130° C. in vacuo and having a refraction index $n_D^{20}$ 1.5470 are formed in accordance with Example 23. The foam has the following physical properties:

Bulk density _____kg./m.$^3$__ 36
Tearing strength _____kg./cm.$^2$__ 1.1
Elongation at break _____percent__ 365
Elasticity _____do____ 50
Permanent elongation _____do____ 20

If the 1 part by weight of the tin phenolate is replaced by a mixture of 0.8 part by weight of the tin phenolate and 0.2 part by weight of permethylated N-amino ethyl piperazine, the foam has the following mechanical properties:

Bulk density _____kg./m.$^3$__ 37
Tearing strength _____kg./cm.$^2$__ 1.2
Elongation at break _____percent__ 370
Elasticity _____do____ 48
Permanent elongation _____do____ 20

Example 25

100 parts by weight of a linear polypropylene glycol (OH number 56), 38 parts by weight of toluylene diisocyanate, 1.5 parts by weight of a silicone oil prepared by transesterification of 1 mol of $$C_2H_5-O-(Si(CH_3)_2O-)_9C_2H_5$$

with 2 mols of ethanol amine, 2.9 parts by weight of water and 1.5 parts by weight of a tin compound of the formula

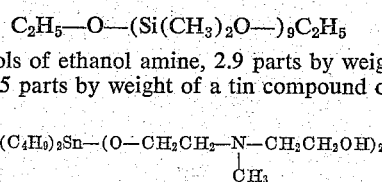

prepared by transesterification of 1 mol of dibutyl dimethoxy tin with 2 mols of N-methyl diethanol amine up to 130° C. are mechanically mixed to produce a quickly rising and hardening foam with good mechanical properties. Instead of the tin compound prepared from N-methyl diethanol amine, the corresponding tin compound prepared from diethanol amine can be used as well.

Example 26

100 parts by weight of the polypropylene glycol of Example 23, 38 parts by weight of toluylene diisocyanate, 1.5 parts by weight of the polysiloxane of Example 23, 2.6 parts by weight of water and 0.9 part by weight of dioctyl-tin-bis-(5-diethyl amino pentylate-2) prepared by transesterification of 1 mol of dioctyl dimethoxy tin with 2 mols of 1-diethyl amino pentanol-4 and having a refraction index $n_D^{20}$ 1.4700 are mechancally mixed. The resulting foam has a bulk density of 49 kg./m.$^3$, an elasticity of 35%, a tearing strength of 1.1 kg./cm.$^2$ and an elongation at break of 240%.

Example 27

100 parts by weight of the polypropylene glycol of Example 23, 38 parts by weight of toluylene diisocyanate, 1 part by weight of the polysiloxane of Example 23, 2.8 parts by weight of water, 0.2 part by weight of endoethylene piperazine and 3 parts by weight of a 33% solution in acetone of a basic dibenzyl tin phenolate prepared from 1 mol of dibenzyl tin dichloride and 2 mols of the sodium compound of 2,4,6-tris-(dimethyl amino methyl) phenol (M.P. 55–60° C.) are mixed to produce a foam with good mechanical properties.

*Example 28*

100 parts by weight of the polypropylene glycol of Example 23, 38 parts by weight of toluylene diisocyanate, 1 part by weight of the polysiloxane of Example 23, 2.8 parts of water and 1 part by weight of a basic triethyl tin phenolate prepared by transesterification of 1 mol of triethyl methoxy tin with 1 mol of 2,4,6-tris-(dimethyl amino methyl)-phenol and having a refraction index $n_D^{20}$ 1.5028 are mixed in a machine. The quickly rising and setting foam has a bulk denisty of 37 kg./m.³, an elasticity of 34%, an elongation of break of 110% and a tearing strength of 1 kg./cm.².

*Example 29*

100 parts by weight of a polyether isocyanate (9% NCO), prepared from 100 parts by weight of the linear polypropylene glycol of Example 25 and 37.3 parts by weight of toluylene diisocyanate, 0.8 parts by weight of polydimethyl siloxane, 1.9 parts by weight of water and 0.2 part by weight of the tin compound of Example 23 are mixed and expanded to give a foam with good mechanical properties.

*Example 30*

100 parts by weight of the polypropylene glycol of Example 9, 38 parts by weight of toluylene diisocyanate of Example 6, 1.5 parts by weight of the silicone oil of Example 6, 2.9 parts by weight of water and 1 part by weight of the tin oxime compound of Example 10, are mixed together in the foaming apparatus described in French Patent Specification 1,074,713. A quickly setting foam having good mechanical properties is obtained within 1.2 minutes. The foam is cured within 10 minutes. Mechanical properties under A.

If 1 part by weight of the tin oxime compound is replaced by 0.75 part by weight of that compound and 0.25 part by weight of permethylated N-amino ethyl piperazine, a foam is obtained with the mechanical properties under B.

| | A | B |
|---|---|---|
| Bulk density, kg./m.³ | 38 | 33 |
| Tearing strength, kg./cm.² | 1.1 | 0.9 |
| Elongation at break, percent | 415 | 385 |
| Elasticity, percent | 50 | 46 |
| Permanent elongation, percent | 14 | 17 |

*Example 31*

100 parts by weight of a polyether isocyanate (9% NCO), prepared by reacting together 100 parts by weight of the polypropylene glycol of Example 11 with 37.3 parts by weight of toluylene dioscyanate of Example 8 1.9 parts by weight of water, 0.2 part by weight of N-ethyl-morpholine, 1 part by weight of polydimethyl siloxane and 2 parts by weight of a 50% solution in acetone of the reaction product of 116 parts by weight of diacetyl dioxime and 295 parts by weight of dibutyl dimethoxy tin, are mechanically mixed together to produce a quickly rising foam with good mechanical properties.

*Example 32*

100 parts by weight of polypropylene glycol of Example 9, 38 parts by weight of toluylene diisocyanate of Example 6, 1 part by weight of the silicone oil of Example 6, 2.6 parts by weight of water and 0.8 part by weight of a basic tin oxime compound prepared by transesterification of 205 parts by weight of dioctyl dimethoxy tin with 172 parts by weight of 1-diethyl amino pentanone-4-oxime up to 130° C., and having a refraction index $nd^{20}$ 1.4822 result in quickly hardening foam having a

| | | |
|---|---|---|
| Bulk density of | kg./m.³ | 36 |
| Tearing strength of | kg./cm.² | 1.1 |
| Elongated at break of | percent | 175 |
| Elasticiy of | do | 36 |
| Permanent elongation | do | 10 |

If the dioctyl tin derivative is replaced by 1 part by weight of the corresponding dibenzyl tin derivative (refraction index $nd^{20}$ 1.5417) a foam is obtained with similar physical properties.

*Example 33*

100 parts by weight of the polypropylene glycol of Example 9, 38 parts by weight of toluylene diisocyanate of Example 6, 1 part by weight of the polydimethyl siloxane of Example 6, 2.6 parts by weight of water and 0.7 part by weight of a basic triethyl tin oxime prepared by transesterification of 70 parts by weight of triethyl methoxy tin with 51.6 parts by weight of 1-diethyl amino pentanone-4-oxime and having a refraction index $nd^{20}$ 1.4821, are mixed together mechanically. A quickly setting foam with the following mechanical properties is obtained:

| | | |
|---|---|---|
| Bulk density | kg./m.³ | 34 |
| Tearing strength | kg./cm.² | 1.1 |
| Elongation at break | percent | 260 |
| Elasticity | do | 33 |

Any other suitable organic polyisocyanate, organic compound containing at least two active hydrogen containing groups, tin compound or other additive as more particularly set forth above could have been used in the examples with equally satisfactory results.

The term "tertiary nitrogen atom" as used throughout the specification and claims means a nitrogen atom that is attached to three other atoms including three carbon atoms, two carbon atoms and one sulfur atom, two carbon atoms and one nitrogen atom and the like, or a nitrogen atom within the oxime configuration.

Although the invention has been described in considerable detail for the purpose of illustration, it is to be understood that variations may be made therein by those skilled in the art without departing from the spirit of the invention and the scope of the claims.

What is claimed is:

1. Process for the production of a polyurethane from an organic polyisocyanate and polyol which comprises making said reactants with a catalytic amount of a compound of the following formula:

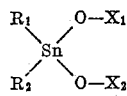

wherein $R_1$ and $R_2$ are hydrocarbon radicals; and $X_1$ and $X_2$ are organic radicals, and at least 1 of $X_1$ and $X_2$ contains a tertiary nitrogen atom.

2. The method of catalyzing the reaction between an organic isocyanate and an organic compound containing at least one active hydrogen containing group which comprises mixing said materials in the presence of a catalytic amount of an organo-tin compound selected from the group consisting of tetravalent tin salts of carboxylic acids, tetravalent tin alcoholates, tetravalent tin phenolates and tetravalent tin oximes containing at least one carbon to tin bond and having a tertiary nitrogen atom in at least one organic radical thereof, the arrangement of the tertiary nitrogen and the tin in the compound being such that each of these functions as a catalyst in the reaction.

3. The method of catalyzing the reaction between an organic polyisocyanate and an organic compound containing at least two active hydrogen containing groups as determined by the Zerewitinoff method which comprises mixing said materials in the presence of a catalytic amount of a dialkyl tin salt of an N,N-dialkyl amino dicarboxylic acid, the arrangement of the tertiary nitrogen and the tin in the compound being such that each of these functions as a catalyst in the reaction.

4. The method of catalyzing the reaction between an organic polyisocyanate and an organic compound containing at least two active hydrogen containing groups as determined by the Zerewitinoff method which comprises mixing said materials in the presence of a catalytic amount of a dialkyl tin N,N-dialkyl amino alcoholate, the arrangement of the tertiary nitrogen and the tin in the compound being such that each of these functions as a catalyst in the reaction.

5. The method of catalyzing the reaction between an organic polyisocyanate and an organic compound containing at least two active hydrogen containing groups as determined by the Zerewitinoff method which comprises mixing said materials in the presence of a catalytic amount of a dialkyl tin N,N-dialkyl amino phenolate, the arrangement of the tertiary nitrogen and the tin in the compound being such that each of these functions as a catalyst in the reaction.

6. The method of catalyzing the reaction between an organic polyisocyanate and an organic compound containing at least two active hydrogen containing groups as determined by the Zerewitinoff method which comprises mixing said materials in the presence of a catalytic amount of a dialkyl tin oxime, the arrangement of the tertiary nitrogen and the tin in the compound being such that each of these functions as a catalyst in the reaction.

7. The method of catalyzing the reaction between an organic isocyanate and an organic compound containing at least one active hydrogen containing group which comprises mixing said materials in the presence of a catalytic amount of an organo-tin compound having the formula:

$$R_n\text{—Sn—}X_{4-n}$$

wherein R is an organic radical, X is an organic radical obtained by removing the terminal hydrogen atom from a member selected from the group consisting of alcohols, phenols, carboxylic acids and oximes, $n$ is an integer of from one to three and at least one member selected from the group consisting of R and X contains a tertiary nitrogen atom, the arrangement of the tertiary nitrogen and the tin in the compound being such that each of these functions as a catalyst in the reaction.

8. In the preparation of a polyurethane plastic by a process which comprises the reaction of the condensation product of an alkylene oxide having a molecular weight of at least about 500 and an organic polyisocyanate, the improvement which comprises effecting the said reaction in the presence of a catalytic amount of an organo tin compound having the formula $$R_n\text{—SN—}X_{4-n}$$

wherein R is an organic radical, X is an organic radical obtained by removing the terminal hydrogen atom from a member selected from the group consisting of alcohols, phenols, carboxylic acids and oximes, $n$ is an integer of from one to three and at least one member selected from the group consisting of R and X contains a tertiary nitrogen atom, the arrangement of the tertiary nitrogen and the tin in the compound being such that each of these functions as a catalyst in the reaction.

9. In the preparation of a cellular polyurethane plastic by a process which comprises reacting an organic polyisocyanate with a polyhydric polyalkylene ether in the presence of a blowing agen, the improvement which comprises mixing said reactants with from about 0.001 percent to about 5 percent by weight of an organo compound having the formula $$R_n\text{—Sn—}X_{4-n}$$

wherein R is an organic radical, X is an organic radical obtained by removing the terminal hydrogen atom from a member selected from the group consisting of alcohols, phenols, carboxylic acids and oximes, $n$ is an integer of from one to three and at least one member selected from the group consisting of R and X contains a tertiary nitrogen atom, the arrangement of the tertiary nitrogen and the tin in the compound being such that each of these functions as a catalyst in the reaction.

10. The process of claim 9 wherein said blowing agent is water.

11. The process of claim 9 wherein said blowing agent is a halohydrocarbon.

12. The process of claim 9 wherein the organic radical, R, is an alkyl radical.

References Cited in the file of this patent
UNITED STATES PATENTS 2,921,915     Boochhagen et al. _____ Jan. 19, 1960
3,084,177     Hostettler et al. _____ Apr. 2, 1963

OTHER REFERENCES

Mobay Publication, "A One Shot System for Flexible Polyether Urethane Foams," Nov. 10, 1958.

Union Carbide, Australian Abstract, 44,550/58, June 25, 1959.

Saunders et al.: Chem. Reviews, 1948, vol. 43, pages 203–218.